Patented July 10, 1945

2,380,009

UNITED STATES PATENT OFFICE 2,380,009

INTERPOLYMERS OF ASYMMETRICAL DICHLOROETHYLENE

Harold Wilfred Arnold, Marshallton, and George Lowrance Dorough, Wilmington, Del., assignors to E. I. du Pont de Nemours & Company, Wilmington, Del., a corporation of Delaware No Drawing. Application July 31, 1940, Serial No. 349,000

8 Claims. (Cl. 260—66)

This invention relates to new polymeric products and more particularly to products obtained by the copolymerization of polymerizable unsaturated compounds.

Asymmetrical dichloroethylene polymerizes readily under ordinary polymerization conditions to yield a polymer which is difficultly fusible under molding conditions, and which is rapidly decomposed at temperatures only slightly above its softening point. Moreover, the articles formed by molding the polymer even under carefully controlled conditions show pronounced brittleness. For these reasons the fabrication of useful articles from the polymer presents a difficult problem.

This invention has as an object the preparation of polymers of asymmetrical dichloroethylene which are readily molded and of greater stability at temperatures above their softening point. A further object is the preparation of dichloroethylene polymers of reduced brittleness. Another object is the preparation of desirable molding compositions. Other objects will appear hereinafter.

These objects are accomplished by the following invention which comprises copolymers of 40–95% asymmetrical dichloroethylene with 5–60% (of the total polymerizable components) of a ketone, in which one of the carbon atoms immediately adjacent to the carbonyl group is part of a hydrocarbon, preferably an alkyl and still more preferably a lower, i. e., one to six, carbon alkyl, radical and the other is attached by an ethylenic double bond to a methylene group.

In the preferred practice of the invention, asymmetrical dichloroethylene is mixed with 10–50% by weight of a ketone in which one of the carbon atoms immediately adjacent to the carbonyl group is part of a hydrocarbon radical, e. g., an alkyl, aryl, aralkyl, or cycloalkyl group, and the other is attached by an ethylenic double bond to a methylene group and by a single bond to hydrogen, a lower, i. e., one to six carbon, alkyl group, an aryl group, or halogen, and the mixture is emulsified in an acidic aqueous medium containing 1–3% of an emulsifying or dispersing agent and 0.1–2% of a water-soluble oxygen-liberating polymerization catalyst such as hydrogen peroxide. The emulsion is placed in a pressure vessel equipped with some means of agitation and heated at a constant temperature of between 40–60° C. with constant or intermittent agitation until polymerization has proceeded to the desired extent.

There are two convenient methods for determining the progress of polymerization:

(1) Periodic determination of specific gravity. As polymerization proceeds, the specific gravity of the emulsion increases markedly, the extent of the increase when polymerization is complete depending primarily on the initial concentration of the monomers and the monomer ratio. It usually is necessary to standardize the method with a given monomer-dispersing medium mixture, checking the specific gravity against the polymer content as determined by analysis. The specific gravity may be determined conveniently by means of a Westphal balance.

(2) Periodic precipitation of samples. In this method, samples of the emulsion are periodically withdrawn from the polymerization vessel, weighed, steam distilled to remove unpolymerized monomers, and precipitated by the addition of an electrolyte such as aluminum sulfate. The precipitated polymer is repeatedly washed with water and dried rapidly at elevated temperature. From the weight of the emulsion sample and the weight of the precipitated polymer, the extent of polymerization can be readily calculated.

When polymerization has proceeded to the desired extent, the emulsion is withdrawn and steam distilled to remove any residual monomer which may be present. It is then diluted with an equal volume of water and precipitated by the addition with rapid stirring of an appropriate quantity of an aqueous solution containing an electrolyte such as aluminum sulfate, calcium chloride, sodium chloride, sulfuric acid, phosphoric acid, hydrochloric acid, or the like. The precipitated polymer is filtered off, washed thoroughly with water until all traces of electrolyte and dispersing agent are removed, and dried. To facilitate drying, the polymer may, if desired, be given a final wash with a low-boiling water miscible organic liquid which is not a solvent for the polymer. Lower aliphatic alcohols or mixtures of these with small percentages of aromatic hydrocarbons are suitable for this purpose. The final wash with alcohol or alcohol-aromatic hydrocarbon mixtures frequently improves the stability of the polymer by removing traces of low molecular weight polymeric products and impurities introduced with the dispersing agent.

The monomer mixture is preferably emulsified before polymerization in an acidic medium. This is done because the copolymerization of asymmetrical dichloroethylene is quite slow in neutral or alkaline media, and the products obtained are less stable than those produced in acid media. It is therefore advantageous to add to the emulsion before polymerization such quantities of acid reacting substances, such as formic, boric, or hydrochloric acid, or acid salts or mixtures of these with buffer salts as are required to adjust the pH to between 1.5 and 5 and preferably to about 2.5–3.5.

Because the copolymerizations are preferably conducted in acidic media, it is necessary to select the emulsifying or dispersing agent very carefully since certain of these materials are not suited to use in acidic media. Dispersing agents which are suitable for use in acid media include salts of true sulfonic acids, such as alkyl naphthalene sulfonic acids, long chain alkyl sulfonic acids, and salts of acid sulfuric esters of long chain alcohols, such as the sodium salt of α-acetoxyoctadecylsulfuric acid.

In addition to hydrogen peroxide a number of water-miscible polymerization catalysts may be used. These include perborates, persulfates, peracetates, peracetic acid, and the like. It is not essential to employ only water-miscible catalysts. Catalysts which are soluble in the monomer mixture may also be used. Among these are acetyl benzoyl peroxide, benzoyl peroxide, dibutyryl peroxide, lauryl peroxide, and succinyl peroxide.

Emulsification of the monomer mixture in the dispersing or emulsifying agent may be accomplished by simple stirring or agitation as by shaking or through the use of a so-called turbulent flow mixer. In carrying out the emulsification it is necessary to avoid elevated temperatures since monomeric asymmetrical dichloroethylene boils only slightly above room temperature.

The vessel in which the polymerization is carried out must be made of a material which is not attacked by acids, and which does not retard the polymerization. It has been found that glass, nickel, stainless steel, and enamel-lined vessels are suitable.

The molecular weight of the copolymers is influenced by polymerization conditions. In general, high temperatures, high catalyst concentrations, and low monomer concentrations lead to relatively low molecular weight products, while low temperatures, low catalyst concentrations, and high monomer concentrations favor the production of relatively high molecular weight products.

The more detailed practice of the invention is illustrated by the following examples, wherein, unless otherwise specified, parts given are by weight. There are of course many forms of the invention other than these specific embodiments.

Example I

A mixture of 70 parts of asymmetrical dichloroethylene and 30 parts of methyl vinyl ketone is emulsified by vigorous shaking in a pressure vessel with a mixture containing 150 parts by volume of water, 2 parts by volume of 30% hydrogen peroxide, 8 parts by weight of a 50% solution of the sodium salt of α-acetoxyoctadecylsulfuric acid and 0.2 part by volume of concentrated hydrochloric acid. The vessel is closed and heated at 50° C. for approximately 67 hours with intermittent shaking. At the end of this time the specific gravity as determined at room temperature is 1.125. The emulsion is filtered through cloth and diluted with approximately an equal volume of water. This mixture is heated to approximately 50° C., and the polymer precipitated by the addition with stirring of a small volume of 10% aluminum sulfate solution. The product is repeatedly washed four to five times with water and finally with methanol, and then dried at room temperature. After drying, the polymer amounts to 68 parts. Analysis shows that it contains 69% by weight of unsymmetrical dichloroethylene. It is readily soluble in dioxan, giving a colorless solution from which clear, exceptionally tough films can be cast. On molding under pressure, a light-colored, very tough article which becomes flexible at about 56° C. is produced.

Example II

A mixture of 80 parts of asymmetrical dichloroethylene and 20 parts of methyl vinyl ketone is emulsified in a dispersing medium having the same composition as that described in Example I. The emulsion is heated in a pressure-tight glass vessel at 60° C. for 46 hours with occasional agitation. At the end of this time the specific gravity at room temperature is 1.160. The mixture is steam distilled, diluted with an approximately equal volume of water, and precipitated by the addition of 10% aluminum sulfate solution, 92 parts of product being obtained. Analysis shows that it contains 63.8% by weight of polymerized asymmetrical dichloroethylene. It can be molded to a tough article which becomes pliable at approximately 36° C. when heated in an oil bath. This can be dissolved readily in dioxan to give a 15% solution whose viscosity at 25° C. is 16.5 centipoises.

Example III

A mixture of 275 parts of asymmetrical dichloroethylene, 225 parts of methyl vinyl ketone, and 20 parts of ethylene oxide is emulsified in a pressure vessel in a mixture containing 750 parts by volume of water, 1 part by volume of concentrated hydrochloric acid, 4.2 parts by volume of 30% hydrogen peroxide, and 25 parts by weight of an approximately 50% solution of the sodium salt of α-acetoxyoctadecylsulfuric acid in water. The mixture is heated at 40° C. with occasional agitation for a total of 138 hours. At the end of this time it is steam distilled to remove residual monomer, filtered through cloth, and diluted with approximately an equal volume of water. Five parts of epichlorohydrin is then stirred in, and the mixture cooled to approximately 45° C. The polymer is precipitated in the form of small granules by the addition of a small volume of 10% aluminum sulfate solution. These are washed several times with water, once with 0.5% sodium hydroxide solution, and again several times with water. A total of 350.5 parts of product is obtained. Analysis shows that it contains 51.9% by weight of asymmetrical dichloroethylene. It dissolves readily in dioxan to give a 15% solution whose viscosity at 25° C. is 176 centipoises and can be molded at approximately 160° C. under pressure of about 3000 lbs./sq. in. to very tough articles which become pliable at approximately 86° C. when heated in an oil bath.

Example IV

A mixture of 32.5 parts of asymmetrical dichloroethylene and 17.5 parts of methyl vinyl ketone is emulsified in a mixture consisting of 75 parts by volume of water, 0.1 part by volume of 12 normal hydrochloric acid, 0.5 part by volume of 30% hydrogen peroxide, and 3 parts by weight of an approximately 50% solution of the sodium salt of α-acetoxyoctadecylsulfuric acid in water. The mixture is placed in a glass pressure vessel and heated at 40—45° C. for 138 hours with occasional agitation. The polymer is precipitated and washed as in Example I, and dried at room temperature. The yield amounts to 43.5 parts. Analysis of the product shows that it contains 68% by weight of polymerized asymmetrical dichloroethylene. It molds at 115–120° C. to a tough article which becomes pliable at approximately 57° C. when heated in an oil bath. It dissolves readily in dioxan to give a clear solution from which clear, tough, resilient films can be cast. Sheets of the copolymer, formed by hot pressing, on being subjected to a cold rolling operation, show a tensile strength of 10,000–13,500 lbs./sq. in.

*Example V*

A mixture of 52.5 parts of asymmetrical dichloroethylene, 27.5 parts of methyl vinyl ketone and 2 parts of ethylene oxide is emulsified in a pressure vessel in a dispersing agent/catalyst mixture having the same composition as that in the preceding example. The mixture is heated at 45–50° C. with occasional vigorous agitation for a total of 93.5 hours. At the end of this time it is steam distilled to remove residual monomer, diluted with an approximately equal volume of water, and precipitated by the addition of 10% aluminum sulfate solution. The polymer is repeatedly washed four to five times with distilled water and then stirred for about 15 minutes with a 1% solution of potassium hydroxide initially heated to 60° C. It is filtered, washed with water until alkali free, and finally washed with warm methanol. It is then mixed with an ether solution containing 0.5 part of phenoxypropylene oxide and a current of air is passed over the surface of the mixture while it is being stirred until the ether has completely evaporated. A total of 42 parts of dried product is obtained. Analysis shows it contains 44% by weight of polymerized asymmetrical dichloroethylene. It dissolves readily in dioxan to give a clear solution whose viscosity is 180 centipoises. Films flowed from this solution are colorless, tough, and elastic. The copolymer can be molded readily to a light-colored, clear, tough article which becomes pliable at approximately 48° C.

*Example VI*

A mixture of 10 parts of asymmetrical dichloroethylene and 10 parts of phenyl vinyl ketone is emulsified in a pressure vessel with a mixture containing 30 parts by volume of water, 0.2 part by volume of 30% hydrogen peroxide, 0.04 part by volume of 12 normal hydrochloric acid, and 1.5 parts by weight of an approximately 50% solution of the sodium salt of acetoxyoctadecyl sulfate in water. The mixture is heated at 45° C. with occasional agitation for a total of 48 hours. At the end of this time the polymer is precipitated, washed, and dried as in the preceding example. A total of 6 parts of product is obtained. This can readily be molded at 160° C.

*Example VII*

Ninety-four and a half parts of an aqueous solution containing approximately 32 per cent by weight of the sodium salt of the sulfonic acid derived from the petroleum oil known as "White Oil," and 3.75 parts of ammonium persulfate are dissolved in 1400 parts of water. The pH of this solution is adjusted to 2.45 by the appropriate addition of formic acid solution of 89 per cent concentration. A mixture of 100 parts of this solution with 30 parts of unsymmetrical dichloroethylene and 20 parts of methyl isopropenyl ketone is placed in a glass pressure vessel and the vessel flushed out with oxygen-free nitrogen before closing. The mixture is emulsified by vigorous agitation and heated at a constant temperature of 40° C. for a period of 72 hours. At the end of this time the vessel is opened and the emulsion removed and diluted with an approximately equal volume of water. The resulting mixture is heated to approximately 70° C. and the interpolymer precipitated by the addition of approximately 15 parts of 10 per cent aluminum sulfate solution. The polymer was washed four times with warm water to remove occluded dispersing agent, and then dried. A portion of the product was pressed out between heated plates at 130° C., using a pressure of approximately 2000 lbs./sq. in. The resulting sheet showed excellent strength and toughness.

*Example VIII*

A mixture of 40 parts of unsymmetrical dichloroethylene and 10 parts of methyl isopropenyl ketone is polymerized and the polymer isolated as in Example VII. The yield of polymer amounts to 44 parts. On pressing out between hot plates at 130° C. using a pressure of approximately 2000 lbs./sq. in., the polymer produces a tough, flexible sheet which can be folded over repeatedly without breaking. The sheet is somewhat less rigid than that of Example VII.

In applying the invention, asymmetrical dichloroethylene may be copolymerized with any polymerizable ketone in which one of the carbon atoms immediately adjacent to the carbonyl group is part of a hydrocarbon radical, e. g., an alkyl, aryl, aralkyl, or cycloalkyl group, and the other is attached by an ethylenic double bond to a methylene group, to yield copolymers, containing 40–95% of the asymmetrical dichloroethylene in combination with the ketone. The ketone is thus one wherein one valence of the carbonyl group is attached to a carbon in turn attached to a methylene (CH₂) group, the remaining valence of the carbonyl group being satisfied by a hydrocarbon radical. The polymerizable ketone is represented by the formula

$$CH_2=CR-CO-R'$$

wherein R' is a hydrocarbon radical and R is hydrogen, halogen, alkyl preferably of one to six carbon atoms, or aryl.

The copolymers containing 5–60% of the ketone are tougher than copolymers of greater or less ketone content, are more stable and can be molded at higher temperatures than copolymers of less ketone content, have better molding characteristics, less tendency to be rubbery, and are more uniform. They do not have the water sensitivity of the copolymers of higher ketone content. Furthermore, they can be oriented by rolling whereby improved strengths may be obtained. With less than 5% ketone, the product has the disadvantageous characteristics of unmodified dichloroethylene polymer, namely, a softening temperature so near the decomposition temperature that there is difficulty in making shaped objects under the influence of heat and pressure, and is lacking in tensile strength and toughness. A copolymer formed from a reaction mixture containing more than 60% unsaturated ketone possesses undesirable water sensitivity and also shows deficiencies in tensile strength. Thus when the ketone is methyl vinyl ketone, the products containing more than 60% ketone are very low softening and become tacky at relatively low temperature. Their strength is poor and they show very slow retraction when stretched. Cold drawing or cold rolling does not materially improve their strength. In general, their physical properties are such as to preclude extensive application in various plastics and coating applications. Furthermore, these polymers are sensitive to water (whiten on exposure to water) and are attacked by alkalies. When the ketone is methyl isopropenyl ketone or phenyl vinyl ketone, the copolymers containing more than 60% ketone, although considerably higher softening than similar compositions containing methyl vinyl ketone tend to be brittle. They are not materially improved by cold drawing or cold rolling. As with the methyl vinyl ketone polymers they are excessively sensitive to water and alkalies.

The 40 to 95% dichloroethylene copolymers when molded or formed by heat and pressure show excellent strength and toughness. In the form of sheets or films they can be repeatedly bent around a small radius without breaking and they show good resilience. Their strength and toughness are improved markedly by cold drawing or cold rolling. Cold rolled or cold drawn sheets or foils may show tensile strengths in excess of 15,000 lbs. per sq. in. The 40 to 95% copolymers are also much less sensitive to water and alkalies than those with high ketone contents.

The 40 to 95% dichloroethylene copolymers are more resistant to burning than those containing more than 60% ketone.

The copolymers containing more than 60% ketone are, for the majority of plastics uses, too susceptible to the action of a wide variety of organic solvents. The 40 to 95% dichloroethylene products while readily soluble in selected solvents are more resistant to the general run of solvents and can therefore be used in applications from which those containing more than 60% ketone would be excluded.

The copolymers containing more than 95% unsymmetrical dichloroethylene soften only slightly below their decomposition point. They are therefore subject to considerable decomposition and degradation when molded. Furthermore very high molding temperatures are required, a disadvantage from the practical standpoint. The products containing more than 95% unsymmetrical dichloroethylene show poor strength as compared with the 40 to 95% products. The solubility of the 40 to 95% dichloroethylene products is better than that of those containing more than 95% unsymmetrical dichloroethylene.

The stability to heat and light of products containing more than 95% unsymmetrical dichloroethylene is considerably poorer than that of the 40 to 95% products.

Generally speaking, in the preparation of the 40 to 95% copolymers there is more or less variation between the original composition of monomer mixture and that of the final product. The extent of this variation appears to depend both on the polymerization conditions and on the original monomer proportions. Factors in the polymerization process which affect these variations are method, catalyst and catalyst concentration, dispersing agent (if emulsion method is used) and concentration thereof, temperature, and oxygen concentration in the polymerization vessel. It is not possible to predict in advance the effect of changing each of these factors, and ordinarily considerable experimentation is required before conditions are found by which a given monomer mixture can be made to yield a polymer having the identical composition.

Asymmetrical dichloroethylene is readily prepared from β-trichloroethane by reaction with alcoholic potassium hydroxide according to the method described by Regnault, J. prakt. Chem. 18, (I), 8, (1839), or by treatment with aqueous caustic soda solution. Methods described in German Patent 529,604 (I. G.) and British Patent 436,133, may also be applied. According to the preferred method, beta-trichloroethane is slowly dropped into an aqueous solution of sodium hydroxide heated to approximately 70° C. while stirring rapidly. The asymmetrical dichloroethylene as formed is distilled out of the reaction mixture through a fractionating column. Yields in excess of 90% are usually obtained. The monomer so formed may be used directly with good results for copolymerization, or, if desired, can be subjected to further purification by distillation. Depending upon the conditions under which the reaction is carried out, the monomer may boil in the range of approximately 31° C.–37° C. One fractionation through a good column generally yields monomer boiling over a narrow range within the limits of 31–33° C.

Of the unsaturated ketones which it is preferred to use in the preparation of the copolymers of this invention, methyl vinyl ketone is most conveniently prepared by the hydration of monovinylacetylene according to the method described in U. S. Patent 1,967,225. Isopropenyl methyl ketone is best prepared by the reaction of methyl ethyl ketone with formaldehyde followed by dehydration of the primary reaction products, according to the method described by Pepper, British Plastics 10, 609 (1939). Phenyl vinyl ketone is produced by the reaction of acetophenone with formaldehyde in the presence of ammonium chloride, according to the method described by Van Marle and Tollens, Ber. 36, 1355 (1913). Alpha-chlorovinyl ketones may be prepared by the chlorination of alkyl vinyl ketones followed by dehydrohalogenation of the product, as described in U. S. Patent 2,173,066. The reaction of acid halides with ethylene hydrocarbons in the presence of Friedel-Crafts type catalysts may in certain instances be used in the preparation of polymerizable unsaturated ketones. Other alpha methylene ketones which may be employed to give the copolymers of this invention include ethyl, propyl, isopropyl, butyl, hexyl and octyl vinyl ketone, phenyl vinyl ketone, p-tolyl vinyl ketone, benzyl vinyl ketone, cyclohexyl vinyl ketone, 2-chloro-1-buten-3-one, 2-methyl-1-buten-3-one, 2-phenyl-1-buten-3-one, etc. Alkyl vinyl ketones and especially lower alkyl vinyl ketones are preferred for reasons of cost and the higher softening point of the copolymer.

In the preferred practice of the invention the copolymers are produced by the emulsion process. This process, as illustrated by the foregoing examples, may, if desired, be modified in several ways. For example, only one component may be emulsified in the catalyst-dispersing agent solution, and polymerization of this material initiated, the second component being added continuously or portion-wise over the period of time required for complete polymerization of the first component. The emulsion process may also be so conducted that the mixture of monomers and the emulsifying catalyst medium are continuously introduced into the lower end of a slightly inclined heated tube, and the mixture forced through the tube at such a rate that at the temperature being used polymerization is virtually complete when the mixture reaches the upper end of the tube. In a further modification of the emulsion process the mixture of monomers may be polymerized in an indifferent organic solvent which is a solvent for the monomers but a non-solvent for the copolymers, and which contains a small percentage of an emulsifying agent which is soluble in the solvent and shows some solvent action on the monomers or polymer.

Other methods of polymerization may, of course, be employed. For example, the components may be copolymerized in bulk without added diluent, in a vessel having any desired form. The product by this method is usually a clear, vitreous mass having the shape of the container, and it may, if desired, be dissolved in appropriate solvents such as aromatic hydrocarbons, chlorinated hydrocarbons, ketones, esters, or dioxan and precipitated in finely divided form by the addition of appropriate nonsolvents such as water, lower aliphatic alcohols, or aliphatic hydrocarbons.

There are two modifications of the solution method which may be applied: (a) polymerization in a medium which is a solvent for the monomer mixture but a nonsolvent for the polymer, and (b) polymerization in a medium which is a solvent both for the monomer and the polymer. In the first modification solvents such as aliphatic alcohols, aliphatic hydrocarbons, and mixtures of water and lower aliphatic alcohols may be used, and the copolymers are usually precipitated as they are formed, in finely divided or flocculent form. In the second modification of the solution method the products are obtained in the form of more or less viscous solutions which may, if desired, be applied directly as coating compositions.

The "granular" method may also be employed. This involves rapidly agitating the monomer mixture containing a small percentage of the peroxidic polymerization catalyst with an aqueous solution containing a small percentage (up to about 3%) of a protective colloid of the type of soluble starch, methylated starch, partially hydrolyzed polyvinyl acetate, the sodium salts of polymers or interpolymers containing acrylic or methacrylic acid, polymethacrylamide, sodium starchglycolate, sodium celluloseglycolate, etc., in a vessel equipped with a reflux condenser and at such temperatures that moderate reflux is maintained. Or the polymerization may be conducted in a closed vessel at higher temperatures provided that rapid agitation is maintained. Under these conditions the monomer is dispersed in the form of small droplets which solidify as polymerization proceeds, to give the polymer in the form of small granules or globules. These remain suspended in the aqueous medium so long as rapid agitation is maintained but settle out rapidly when agitation is suspended. The granules are readily filtered from the mixture, washed free of occluded protective colloid, and dried.

Although the preferred temperature range at which polymerization is carried out is 40–60° C., wider ranges of temperature may be employed; for example, from about 30–100° C. The temperature need not be maintained constant but may, if desired, be gradually increased as polymerization proceeds. Furthermore, although the preferred catalyst concentration range lies between 0.1–1%, wider limits may be used, for example, from about 0.01–3%. If desired, polymerization may be accelerated by exposure of the polymerization mixture to ultraviolet light.

Ordinarily, the copolymerization is conducted in closed vessels under the vapor pressure of the monomer/dispersing agent system at the particular temperature being used. It is frequently desirable to sweep out the vessels with inert gases such as nitrogen or carbon dioxide before initiating polymerization. This procedure serves to remove any oxygen remaining in the vessel and frequently results in more rapid polymerization. Compressed inert gases may, if desired, be introduced into the polymerization vessel to give pressures higher than the vapor pressure of the monomer/dispersing agent system.

The time required for the polymerizations is largely dependent on the conditions used, and may vary from a few hours to several days.

While the copolymers of this invention show far better heat and light stability than unmodified unsymmetrical dichloroethylene polymers, they do undergo some decomposition on long exposure to heat or light. The heat stability may be greatly improved by the addition of stabilizing agents such as epichlorohydrin, 1-phenoxy-2,3-epoxypropane, 1-p-tolyl-2,3-epoxypropane, $\alpha,\alpha$-dimethylglycide, ethylglycidate, cadmium, copper, lead, and manganese salts of oleic, linoleic, stearic, ricinoleic, palmitic, lauric, and fatty oil acids in general, 4-cyclohexylmorpholine, glycine, leucine, alanine, the N-octyl ester of C-dimethylglycine, and monocarboxylic acid amides preferably of the secondary or N-monosubstituted type, having heavy hydrocarbon residues preferably in the form of long chains. Compounds effective as light stabilizers include eugenol, alkyl and aryl esters of salicyclic acid, and guaiacol.

The copolymers of this invention are useful for the preparation of plastics, coatings, fibers, films, and adhesives. Films may be prepared both by casting from solution and by hot pressing and may be subjected to a cold rolling or cold drawing operation to improve their strength. For any of these purposes the copolymers may be combined with or prepared in the presence of plasticizers, stabilizers, fillers, pigments, dyes, softeners, natural resins or other synthetic resins. For many purposes the emulsion produced in the polymerization process may be used directly for coating applications. Specific surfaces to which coatings and impregnated compositions containing these copolymers may be applied include wood, textiles, leathers, metals, cloth, paper, stone, brick, concrete, plaster, and the like.

The above description and examples are intended to be illustrative only. Any modification of or variation therefrom which conforms to the spirit of the invention is intended to be included within the scope of the claims.

What is claimed is:

1. A copolymer of asymmetrical dichloroethylene with a polymerizable ketone which has a single aliphatic unsaturated group and in which the carbonyl group is attached to a carbon atom in turn attached by an ethylenic double bond to a methylene ($CH_2$) group, the other valence of the carbonyl group being satisfied by a monovalent hydrocarbon radical, said copolymer containing 40–95% of dichloroethylene.

2. A copolymer of asymmetrical dichloroethylene with a polymerizable ketone which has a single aliphatic unsaturated group and in which the carbonyl group is attached to a carbon atom in turn attached by an ethylenic double bond to a methylene (CH₂) group, the other valence of the carbonyl group being satisfied by an alkyl radical, said copolymer containing 40-95% of dichloroethylene.

3. A copolymer of asymmetrical dichloroethylene with a polymerizable ketone which has a single aliphatic unsaturated group and in which the carbonyl group is attached to a carbon atom in turn attached by an ethylenic double bond to a methylene (CH₂) group, the other valence of the carbonyl group being satisfied by a lower alkyl radical, said copolymer containing 40-95% dichloroethylene.

4. A copolymer of asymmetrical dichloroethylene with methyl vinyl ketone, said copolymer containing 40-95% of dichloroethylene.

5. A copolymer of asymmetrical dichloroethylene with methyl vinyl ketone, said polymer containing 40-95% of asymmetrical dichloroethylene and being admixed with a stabilizing agent.

6. A copolymer of asymmetrical dichloroethylene with phenyl vinyl ketone, said copolymer containing 40-95% of dichloroethylene.

7. A copolymer of asymmetrical dichloroethylene with methyl isopropenyl ketone, said copolymer containing 40-95% of dichloroethylene.

8. A copolymer of asymmetrical dichloroethylene with an alkyl vinyl ketone, said copolymer containing 40-95% of dichloroethylene.

HAROLD WILFRED ARNOLD.
GEORGE LOWRANCE DOROUGH.